(12) United States Patent
Yokoyama et al.

(10) Patent No.: US 11,926,296 B2
(45) Date of Patent: Mar. 12, 2024

(54) ELECTRIC BRAKE AND CONTROL DEVICE

(71) Applicant: HITACHI AUTOMOTIVE SYSTEMS, LTD., Hitachinaka (JP)

(72) Inventors: Wataru Yokoyama, Yokohama (JP); Daisuke Goto, Atsugi (JP); Kenichiro Matsubara, Kasumigaura (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 874 days.

(21) Appl. No.: 16/970,829

(22) PCT Filed: Feb. 13, 2019

(86) PCT No.: PCT/JP2019/004997
§ 371 (c)(1),
(2) Date: Aug. 18, 2020

(87) PCT Pub. No.: WO2019/163595
PCT Pub. Date: Aug. 29, 2019

(65) Prior Publication Data
US 2020/0377070 A1  Dec. 3, 2020

(30) Foreign Application Priority Data
Feb. 21, 2018  (JP) ................. 2018-028929

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *B60T 8/17* (2013.01); *B60T 17/221* (2013.01);
(Continued)

(58) Field of Classification Search
None
See application file for complete search history.

(56) References Cited

U.S. PATENT DOCUMENTS 5,638,280 A * 6/1997 Nishimura ......... G01C 21/3446
701/418
5,975,250 A * 11/1999 Brandmeier ............ B60T 8/321
188/1.11 E
(Continued)

FOREIGN PATENT DOCUMENTS

JP  2012-159134  8/2012
JP  2015-98253   5/2015

OTHER PUBLICATIONS

International Search Report dated Apr. 9, 2019 in International (PCT) Application No. PCT/JP2019/004997, with English translation.
(Continued)

*Primary Examiner* — Jonathan M Dager
(74) *Attorney, Agent, or Firm* — Wenderoth, Lind & Ponack, L.L.P.

(57) ABSTRACT

An electric brake comprises a brake mechanism that transmits a thrust generated by driving an electric motor to a piston that moves brake pads pressed against a disc rotor; a thrust sensor that detects the thrust applied to the piston; a rotation angle sensor that detects a rotational position of the electric motor; and a rear electric brake ECU that controls the driving of the electric motor on the basis of a braking command. The rear electric brake ECU detects an abnormality in the brake mechanism from a detected value of the thrust sensor and a detected value of the rotation angle sensor in response to the braking command which are obtained when the electric motor is driven.

9 Claims, 13 Drawing Sheets

(51) Int. Cl.
  *B60T 8/17* (2006.01)
  *B60T 17/22* (2006.01)
  *F16D 55/226* (2006.01)
  *F16D 65/18* (2006.01)
  *F16D 121/24* (2012.01)
  *F16D 125/40* (2012.01)

(52) U.S. Cl.
  CPC ............ *F16D 55/226* (2013.01); *F16D 65/18* (2013.01); *B60T 2270/40* (2013.01); *B60T 2270/406* (2013.01); *F16D 2121/24* (2013.01); *F16D 2125/40* (2013.01)

(56) References Cited

U.S. PATENT DOCUMENTS

| | | | | |
|---|---|---|---|---|
| 6,061,628 | A * | 5/2000 | Hayashi | G08G 1/096844 701/411 |
| 7,133,771 | B1 * | 11/2006 | Nesbitt | G01C 21/3453 701/428 |
| 7,734,410 | B2 * | 6/2010 | Tooyama | G01C 21/3694 340/995.13 |
| 7,881,861 | B2 * | 2/2011 | Kravets | G08G 1/096816 340/995.12 |
| 8,024,111 | B1 * | 9/2011 | Meadows | G01C 21/3492 340/995.23 |
| 8,108,141 | B2 * | 1/2012 | Ehrlacher | G08G 1/096855 701/422 |
| 8,463,537 | B2 * | 6/2013 | Mueller | G01C 21/362 701/302 |
| 8,606,517 | B1 * | 12/2013 | Ehrlacher | G08G 1/096888 701/425 |
| 8,744,766 | B2 * | 6/2014 | Rakshit | G01C 21/3469 701/527 |
| 9,008,888 | B1 * | 4/2015 | Gravino | G01C 21/3682 701/426 |
| 9,360,335 | B1 * | 6/2016 | Powelson | G01C 21/3415 |
| 9,547,986 | B1 * | 1/2017 | Curlander | G08G 1/04 |
| 9,784,589 | B1 * | 10/2017 | Gyenes | G01C 21/3896 |
| 10,030,730 | B2 * | 7/2018 | Yabusaki | F16D 66/026 |
| 10,100,891 | B2 * | 10/2018 | Masuda | H02P 15/00 |
| 10,133,995 | B1 * | 11/2018 | Reiss | G06Q 50/12 |
| 10,454,401 | B2 * | 10/2019 | Ono | H02P 3/26 |
| 10,663,518 | B2 * | 5/2020 | Yoshiura | G01R 31/343 |
| 2005/0235820 | A1 * | 10/2005 | Fujiwara | B60T 7/042 91/369.2 |
| 2006/0184314 | A1 * | 8/2006 | Couckuyt | G01C 21/3423 340/995.19 |
| 2007/0027628 | A1 * | 2/2007 | Geelen | G01S 19/24 701/469 |
| 2007/0150369 | A1 * | 6/2007 | Zivin | G06Q 30/0631 705/26.7 |
| 2007/0168118 | A1 * | 7/2007 | Lappe | G01C 21/005 701/408 |
| 2007/0293958 | A1 * | 12/2007 | Stehle | G08G 1/00 700/89 |
| 2008/0179941 | A1 * | 7/2008 | Matsushita | B60T 8/3275 303/20 |
| 2009/0171567 | A1 * | 7/2009 | Morimoto | G01C 21/3685 701/465 |
| 2010/0036599 | A1 * | 2/2010 | Froeberg | G01C 21/3461 701/532 |
| 2010/0062897 | A1 * | 3/2010 | Nishino | B60T 7/042 477/29 |
| 2011/0066345 | A1 * | 3/2011 | Nasu | B60T 1/10 701/70 |
| 2011/0106429 | A1 * | 5/2011 | Poppen | G01C 21/3476 701/533 |
| 2011/0246061 | A1 * | 10/2011 | Hayashi | G01C 21/3469 701/533 |
| 2012/0123678 | A1 * | 5/2012 | Poppen | G01C 21/3415 701/400 |
| 2012/0123806 | A1 * | 5/2012 | Schumann, Jr. | G06Q 40/08 705/4 |
| 2012/0136689 | A1 * | 5/2012 | Ickman | G06Q 50/01 705/7.19 |
| 2012/0158299 | A1 * | 6/2012 | Cerecke | G01C 21/3446 701/533 |
| 2012/0193177 | A1 * | 8/2012 | Goto | F16D 65/18 188/161 |
| 2012/0239288 | A1 * | 9/2012 | Forutanpour | G01C 21/3476 701/410 |
| 2012/0253661 | A1 * | 10/2012 | Tuukkanen | G01C 21/34 701/426 |
| 2013/0197771 | A1 * | 8/2013 | Takeda | B60T 13/745 701/70 |
| 2013/0270895 | A1 * | 10/2013 | Nishioka | B60T 13/161 303/14 |
| 2014/0005941 | A1 * | 1/2014 | Paek | G01C 21/3415 701/538 |
| 2014/0236462 | A1 * | 8/2014 | Healey | G01C 21/34 701/117 |
| 2014/0282093 | A1 * | 9/2014 | Burke | H04W 4/023 715/753 |
| 2014/0372498 | A1 * | 12/2014 | Mian | B61L 25/028 709/201 |
| 2015/0032366 | A1 * | 1/2015 | Man | H04W 4/024 701/414 |
| 2015/0120176 | A1 * | 4/2015 | Curtis | G06T 11/206 701/119 |
| 2015/0338852 | A1 * | 11/2015 | Ramanujam | G08G 1/202 701/2 |
| 2015/0339928 | A1 * | 11/2015 | Ramanujam | G08G 1/202 701/23 |
| 2016/0069694 | A1 * | 3/2016 | Tao | G01C 21/343 701/410 |
| 2016/0109251 | A1 * | 4/2016 | Thakur | G01C 21/3697 705/335 |
| 2016/0109252 | A1 * | 4/2016 | Caine | G01C 21/36 701/533 |
| 2016/0142964 | A1 * | 5/2016 | Todasco | H04W 48/00 455/41.2 |
| 2016/0203422 | A1 * | 7/2016 | Demarchi | G06F 16/29 705/6 |
| 2016/0221553 | A1 * | 8/2016 | Watanabe | B60T 8/4081 |
| 2016/0223348 | A1 * | 8/2016 | Witte | G01C 21/3492 |
| 2016/0229404 | A1 * | 8/2016 | Byun | H04W 4/21 |
| 2016/0244042 | A1 * | 8/2016 | Nishikawa | F16D 65/18 |
| 2016/0273930 | A1 * | 9/2016 | Wada | G08G 1/096883 |
| 2016/0298974 | A1 * | 10/2016 | Newlin | G08G 1/0141 |
| 2016/0298977 | A1 * | 10/2016 | Newlin | G01C 21/3679 |
| 2016/0334233 | A1 * | 11/2016 | Baverstock | B60W 10/18 |
| 2016/0379486 | A1 * | 12/2016 | Taylor | G08G 1/08 340/905 |
| 2017/0167882 | A1 * | 6/2017 | Ulloa Paredes | G01C 21/3438 |
| 2017/0169373 | A1 * | 6/2017 | Roulland | G06Q 10/06313 |
| 2017/0192437 | A1 * | 7/2017 | Bier | G05D 1/0077 |
| 2017/0213273 | A1 * | 7/2017 | Dietrich | G06Q 20/4016 |
| 2017/0262790 | A1 * | 9/2017 | Khasis | G08G 1/012 |
| 2017/0268891 | A1 * | 9/2017 | Dyrnaes | G01C 21/3492 |
| 2017/0276507 | A1 * | 9/2017 | Zacharenko | G06T 11/206 |
| 2017/0300049 | A1 * | 10/2017 | Seally | G08G 1/202 |
| 2017/0314939 | A1 * | 11/2017 | Carter | G01C 21/3492 |
| 2017/0314948 | A1 * | 11/2017 | Racah | G01C 21/28 |
| 2017/0314949 | A1 * | 11/2017 | Rovik | G01C 21/3476 |
| 2017/0337813 | A1 * | 11/2017 | Taylor | G05D 1/0285 |
| 2017/0370738 | A1 * | 12/2017 | Park | G01C 21/3667 |
| 2018/0143027 | A1 * | 5/2018 | Schlesinger | G01C 21/343 |
| 2018/0143649 | A1 * | 5/2018 | Miao | B60W 60/00 |
| 2018/0162338 | A1 * | 6/2018 | Irwan | B60T 8/171 |
| 2018/0188065 | A1 * | 7/2018 | Brooks | G01C 21/343 |
| 2018/0211541 | A1 * | 7/2018 | Rakah | G08G 1/148 |
| 2018/0211546 | A1 * | 7/2018 | Smartt | H04W 4/46 |
| 2018/0259976 | A1 * | 9/2018 | Williams | G01C 21/3664 |
| 2019/0042857 | A1 * | 2/2019 | Endo | G06V 20/58 |
| 2019/0111901 | A1 * | 4/2019 | Beck | B64C 25/42 |
| 2019/0113927 | A1 * | 4/2019 | England | G06N 5/046 |
| 2019/0147736 | A1 * | 5/2019 | Camp | G08G 1/0133 340/905 |
| 2019/0248351 | A1 * | 8/2019 | Wulf | B60T 13/683 |
| 2019/0351884 | A1 * | 11/2019 | Tajima | F16D 65/183 |

(56) References Cited

U.S. PATENT DOCUMENTS

| | | | |
|---|---|---|---|
| 2020/0262399 A1* | 8/2020 | Yokoyama | B60T 8/00 |
| 2021/0387607 A1* | 12/2021 | Takeya | B60T 13/662 |
| 2022/0032886 A1* | 2/2022 | Goto | B60T 8/17 |
| 2023/0287949 A1* | 9/2023 | Baek | F16D 65/18 |
| | | | 188/71.8 |

OTHER PUBLICATIONS

Written Opinion of the International Searching Authority dated Apr. 9, 2019 in International (PCT) Application No. PCT/JP2019/004997, With English translation.

\* cited by examiner

ELECTRIC BRAKE AND CONTROL DEVICE

TECHNICAL FIELD

The Invention relates to electric brakes that impart braking forces to vehicles, such as automobiles, and to control devices used for the electric brakes.

BACKGROUND ART

An electric brake includes a brake mechanism that transmits a thrust generated by driving an electric motor to a piston that moves brake pads pressed against a disc. Electric brakes that have been known are configured to implement motor control adapted to temporal changes in brake pads on the basis of the rotational position and the thrust of electric motors (see Patent Literature 1, for example).

CITATION LIST

Patent Literature

PTL 1: Japanese Unexamined Patent Application Publication (Kokai) No. 2012-159134

SUMMARY OF INVENTION

Technical Problem

The electric brake discussed in Patent Literature 1 is capable of detecting an abnormality in a brake mechanism. On the other hand, the electric brake discussed in Patent Literature 1 is not capable of detecting specifically what kind of abnormality occurs in the brake mechanism.

Solution to Problem

An object of the invention is to provide an electric brake and a control device which are capable of specifying an abnormality in a brake mechanism on the basis of relation between a rotational position and a thrust of an electric motor.

An electric brake according to one embodiment of the invention comprises a brake mechanism configured to transmit a thrust generated by driving an electric motor to a piston that moves brake pads pressed against a disc; a thrust detecting portion configured to detect the thrust applied to the piston; a rotational position detecting portion configured to detect a rotational position of the electric motor; and a control device configured to control the driving of the electric motor on the basis of a braking command. The control device detects an abnormality in the brake mechanism from a detected value of the thrust detecting portion and a detected value of the rotational position detecting portion in response to the braking command which are obtained when the electric motor is driven.

Another embodiment provides a control device configured to control an electric motor of an electric brake comprising a brake mechanism that transmits a thrust generated by driving the electric motor to a piston that moves brake pads pressed against a disc. The control device detects an abnormality in the brake mechanism from the thrust of the electric motor and the rotational position of the electric motor in response to a braking command or a position of the piston which are obtained when the electric motor is driven.

The one embodiment of the invention makes it possible to specify an abnormality in a brake mechanism and raise an immediate alert to a driver. This improves maintainability and safety.

DESCRIPTION OF EMBODIMENTS

An electric brake according to an embodiment will be discussed below with reference to the attached drawings, taking as an example a case where the electric brake is applied to a four-wheel automobile.

Figure 1:
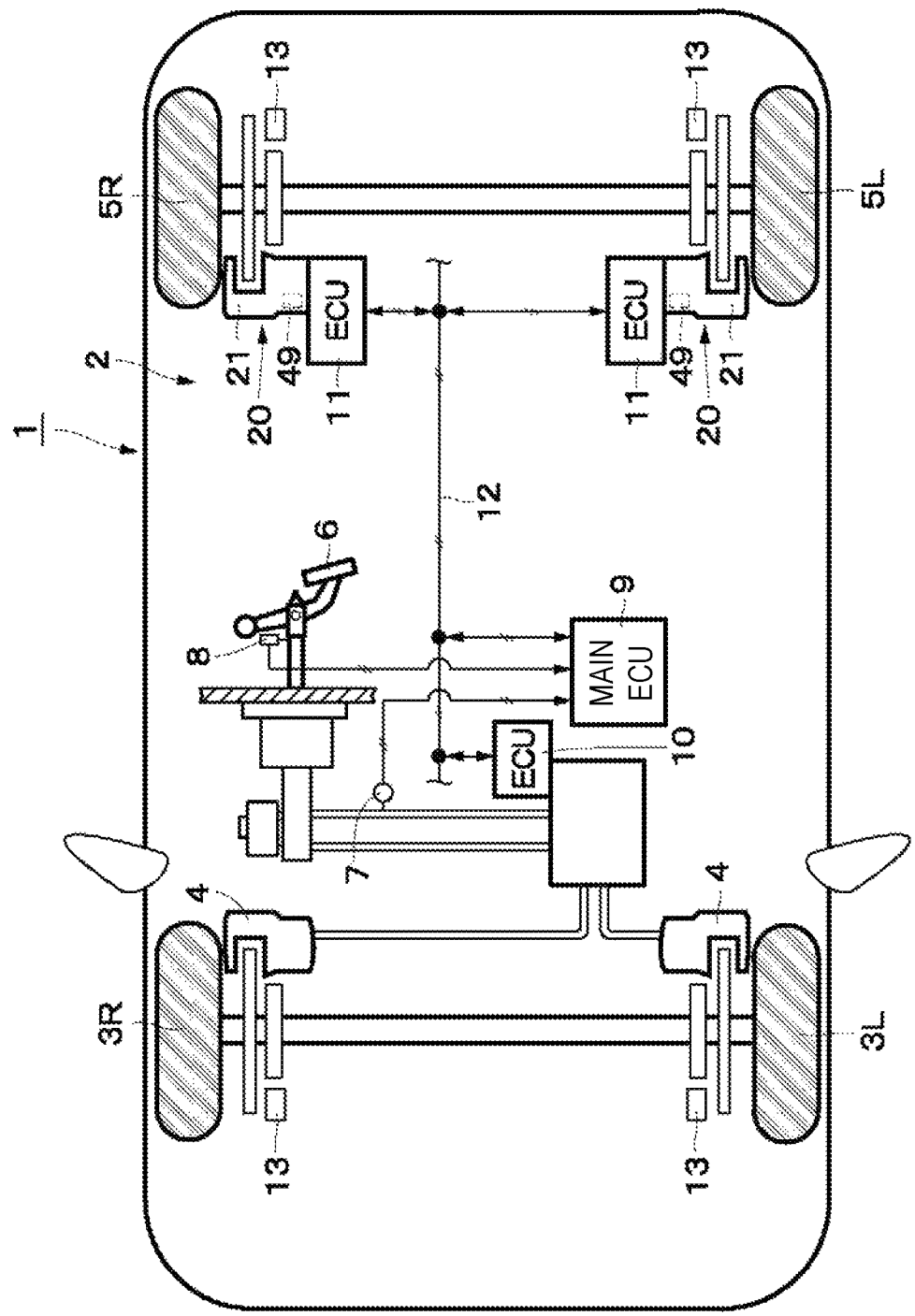
FIG. 1 shows a system configuration of a vehicle to which an electric brake according to an embodiment of the invention is applied.

FIG. 1 shows a system configuration of a vehicle 1 to which an electric brake 20 according to an embodiment of the invention is applied. A brake device 2 installed in the vehicle 1 includes hydraulic brakes 4 respectively provided to a left front wheel 3L and a right front wheel 3R (front braking mechanism) and electric brakes 20 respectively provided to a left rear wheel 5L and a right rear wheel 5R (rear braking mechanism). A main ECU 9 is connected to a hydraulic pressure sensor 7 and a pedal stroke sensor 8 which measure an amount of operation of a brake pedal 6 by a driver. In response to input of signals from the hydraulic pressure sensor 7 and the pedal stroke sensor 8, the main ECU 9 computes a target braking force applied to each wheel (four wheels) through a predetermined control program. On the basis of the calculated braking forces, the main ECU 9 sends a braking command for each of the two front wheels to a front hydraulic pressure device ECU 10 (namely an ESC boost ECU) through a CAN 12 (Controller Area Network). On the basis of the calculated braking forces, the main ECU 9 sends a braking command for each of the two rear wheels to a rear electric brake ECU 11 through the CAN 12. The main ECU 9 is connected to wheel speed sensors 13 respectively provided near the front wheels 3L and 3R and the rear wheels 5L and 5R. This enables the main ECU 9 to detect a wheel speed of each of the wheels. The rear electric brake ECU 11 forms a control device that controls the driving of an electric motor 39 on the basis of the braking commands.

A specific configuration of each of the electric brakes 20 will be now discussed with reference to FIGS. 1 and 2.

Each of the electric brake 20 includes a brake mechanism 21 that transmits a thrust generated by driving the electric motor 39 to a piston 32 that moves brake pads 22 and 23 pressed against a disc rotor D (disc); a thrust sensor 44 that detects the thrust transmitted to the piston 32; a rotation angle sensor 46 that detects a rotational position of the electric motor 39; and the rear electric brake ECU 11 functioning as the control device that controls the driving of the electric motor 39 on the basis of the braking command.

Figure 2:
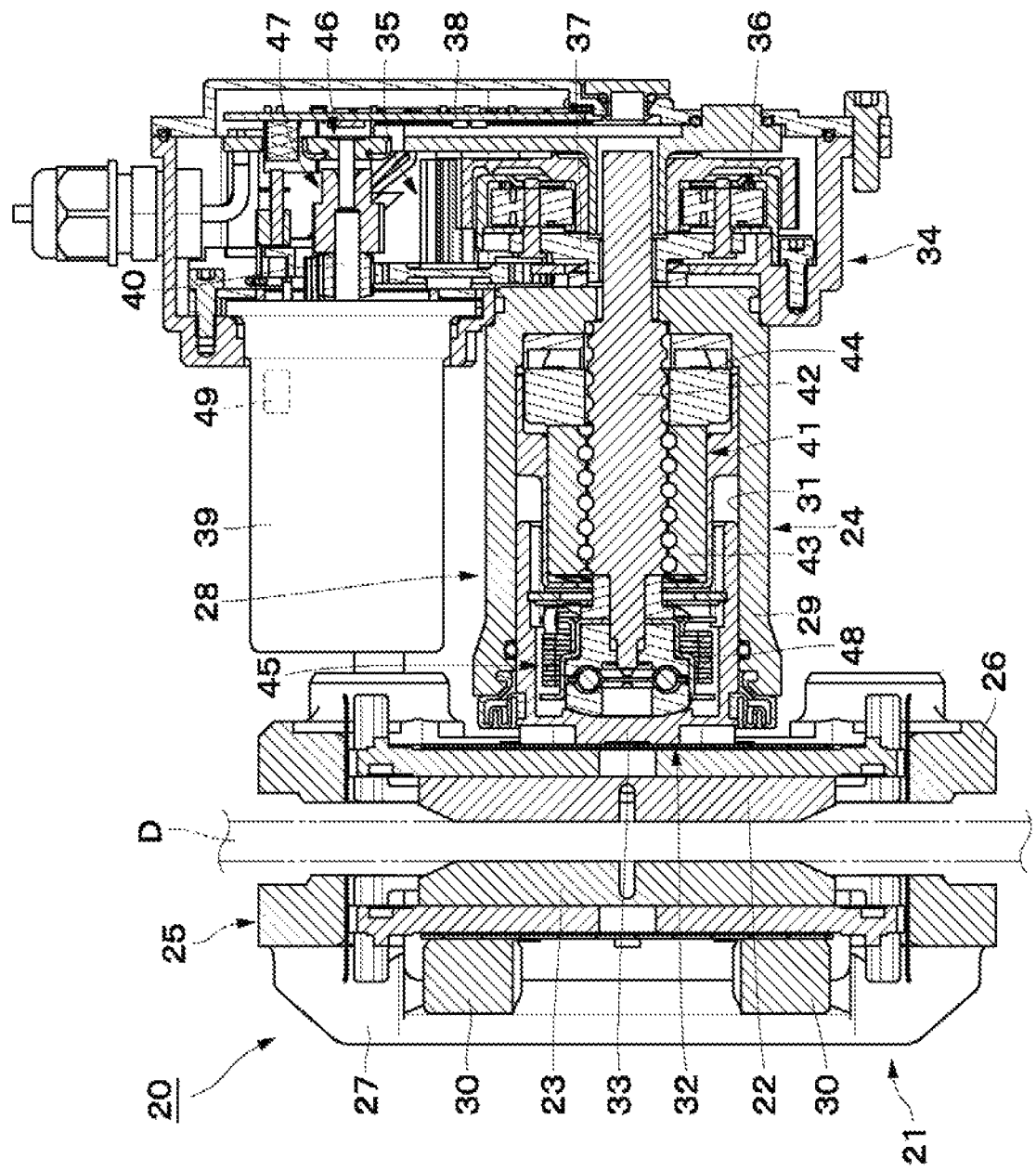
FIG. 2 is a cross-section of the electric brake.

As illustrated in FIG. 2, the brake mechanism 21 includes a pair of an inner brake pad 22 and an outer brake pad 23, and a caliper 24. The inner brake pad 22 and the outer brake pad 23 are arranged on each side of the disc rotor D in an axial direction with the disc rotor D sandwiched therebetween. The disc rotor D is fixed to a rotary portion of the vehicle 1. The electric brake 20 is of a floating caliper type. The pair of the inner brake pad 22 and the outer brake pad 23 and the caliper 24 are supported by a bracket 25 fastened to a non-rotary portion, such as a knuckle, of the vehicle 1.

The bracket 25 includes an inner-side support portion 26 and an outer-side support portion 27 which independently support the inner brake pad 22 and the outer brake pad 23, respectively. The inner brake pad 22 is supported on an inner side of the inner-side support portion 26 to be movable along the axial direction of the disc rotor D. The outer brake pad 23 is supported on an inner side of the outer-side support portion 27 to be movable along the axial direction of the disc rotor D.

The caliper 24 includes a caliper body 28 that is a major part of the caliper 24 and the electric motor 39 arranged beside the caliper body 28. A tubular cylinder portion 29 and a claw portion 30 are integrally formed in the caliper body 28. The cylinder portion 29 is arranged in a proximal end portion facing the inner brake pad 22 on the inner side of the vehicle and opens toward the inner brake pad 22. The claw portion 30 extends from the cylinder portion 29 to the outer side across the disc rotor D and is arranged on a distal end side facing the outer brake pad 23 on the outer side of the vehicle.

A bottomed cylinder 31 is formed in the cylinder portion 29. The piston 32 is intended to press the inner brake pad 22. The piston 32 is formed to have a bottomed cup-like shape. The piston 32 has a bottom portion 33 that is contained within the cylinder 31 to face the inner brake pad 22.

A gear housing 34 is arranged on a bottom wall side of the cylinder portion 29 of the caliper body 28. Contained inside the gear housing 34 are a spur gear multistage deceleration mechanism 35, a planetary gear deceleration mechanism 36, and a control board 38. The control board 38 is provided with the rear electric brake ECU 11 functioning as a control device comprising, for example, a microcomputer.

The rear electric brake ECU 11 controls the driving of the electric motor 39 on the basis of the braking command. The rear electric brake ECU 11 implements programs including abnormality judgment processing which are illustrated in FIGS. 8 to 14. The programs are previously stored in a memory, not shown. When implementing the programs, the rear electric brake ECU 11 detects an abnormality in the brake mechanism 21 from a detected value of the thrust sensor 44 and a detected value of the rotation angle sensor 46 in response to the braking command at the time of driving of the electric motor 39. The rear electric brake ECU 11 changes control of the electric motor 39 according to a detected abnormality in the brake mechanism 21.

The caliper body 28 includes the electric motor 39, the spur gear multistage deceleration mechanism 35 and the planetary gear deceleration mechanism 36 which are transmission mechanisms that increase a rotary torque from the electric motor 39, a ball screw mechanism 41 to which rotation from the spur gear multistage deceleration mechanism 35 and the planetary gear deceleration mechanism 36 is transmitted and which imparts a thrust to the piston 32, the thrust sensor 44 that detects a reaction force against the thrust (pressure) applied from the piston 32 to the inner brake pad 22 and the outer brake pad 23, a return mechanism 45 that reserves a rotative force acting in a retreating direction relative to a push rod 42 of the ball screw mechanism 41 when the push rod 42 propels the piston 32, the rotation angle sensor 46 that detects a rotation angle of a rotary shaft 40 of the electric motor 39, and a thrust maintaining portion 47 that maintains the thrust applied from the piston 32 to the inner brake pad 22 and the outer brake pad 23 during braking. The thrust sensor 44 forms a thrust detecting portion that detects the thrust applied to the piston 32.

The spur gear multistage deceleration mechanism 35 and the planetary gear deceleration mechanism 36 reduce the speed of the rotation of the electric motor 39 at predetermined reduction ratio and enhance the rotation. The spur gear multistage deceleration mechanism 35 and the planetary gear deceleration mechanism 36 then transmit the rotation to a carrier 37 of the planetary gear deceleration mechanism 36. Rotation from the carrier 37 is transmitted to the push rod 42 of the ball screw mechanism 41.

The ball screw mechanism 41 converts a rotational motion from the spur gear multistage deceleration mechanism 35 and the planetary gear deceleration mechanism 36, or a rotational motion of the electric motor 39, into a rectilinear motion (hereinafter, referred to as a linear motion for convenience), to thereby impart the thrust to the piston 32. The ball screw mechanism 41 comprises the pus rod 42 functioning as a shaft member, to which the rotational motion from the spur gear multistage deceleration mechanism 35 and the planetary gear deceleration mechanism 36 is transmitted, and a base nut 43 functioning as a nut member, which is engaged in a threaded manner with an outer peripheral surface of the push rod 42. When the push rod 42 moves forward while making a relative rotation with respect to the base nut 43, the piston 32 moves forward to push the inner brake pad 22 against the disc rotor D.

The return mechanism 45 is also referred to as a fail open mechanism. If the electric motor 39, the control board 38 or the like fails during the braking, the return mechanism 45 releases a braking force that is applied by the piston 32 from the inner brake pad 22 and the outer brake pad 23 to the disc rotor D.

The rotation angle sensor 46 is intended to detect the rotation angle of the rotary shaft 40 of the electric motor 39. The rotation angle sensor 46 includes a magnetic member fixed to the rotary shaft 40 of the electric motor 39 and a magnetic detection IC chip, neither shown. The magnetic detection IC chip is used to detect a change in magnetic flux emerging from the magnetic member in a rotating motion. The rotation angle of the rotary shaft 40 of the electric motor 39 thus can be detected through computation by the control board 38. The rotation angle sensor 46 forms a rotational position detecting portion that detects the rotational position of the electric motor 39.

A return spring 48 comprises a coil spring. The return spring 48 is capable of reserving the rotative force acting in the retreating direction relative to the push rod 42. A current sensor 49 is fixed to the electric motor 39. The current sensor 49 detects motor current that is supplied to the electric motor 39 and outputs a signal corresponding to the motor current to the control board 38.

The following description explains operation of braking and braking cancellation in the electric brakes 20 during normal driving.

When braking is applied during the normal driving, the electric motor 39 is driven by a command issued from the rear electric brake ECU 11. Positive rotation of the electric motor 39, namely rotation in a braking direction (applying direction) is transferred through the spur gear multistage deceleration mechanism 35 and the planetary gear deceleration mechanism 36. The positive rotation is thus reduced in speed at the predetermined reduction ratio, enhanced, and transmitted to the carrier 37 of the planetary gear deceleration mechanism 36. The rotation from the carrier 37 is transmitted to the push rod 42 of the ball screw mechanism 41.

The push rod 42 subsequently starts rotating along with the rotation of the carrier 37 and moves forward while making the relative rotation with respect to the base nut 43. When the push rod 42 moves forward while making the relative rotation with respect to the base nut 43, the piston 32 moves forward to push the inner brake pad 22 against the disc rotor D. Due to the reaction force against the pressure applied to the inner brake pad 22 by the piston 32, the caliper body 28 moves to the right in FIG. 2 with respect to the bracket 25. The outer brake pad 23 is thus pressed by the claw portion 30 and then pushed against the disc rotor D. Accordingly, the disc rotor D is wedged between the inner brake pad 22 and the outer brake pad 23, which generates a frictional force and therefore generates a braking force of the vehicle 1.

The disc rotor D continues to be wedged between the inner brake pad 22 and the outer brake pad 23, and the braking force starts being generated. A reaction force generated therefrom is imparted through the push rod 42 and the base nut 43 to the thrust sensor 44. The thrust sensor 44 then detects the thrust that is transmitted from the inner brake pad 22 and the outer brake pad 23 to the disc rotor D by the forward movement of the piston 32.

If the rotation of the push rod 42 further continues, the rotative force acting in the retreating direction with respect to the push rod 42 is reserved in the return spring 48. Thereafter, the driving of the electric motor 39 is controlled by a detection signal issued from the rotation angle sensor 46, the thrust sensor 44, and the like. A braking state is then achieved.

When the braking is released, the rotary shaft 40 of the electric motor 39 is rotated in a reverse direction, that is, a braking release direction (release direction) due to a command from the rear electric brake ECU 11. At the same time, the reverse rotation is transmitted through the spur gear multistage deceleration mechanism 35 and the planetary gear deceleration mechanism 36 to the push rod 42. The push rod 42 accordingly retreats while making a relative rotation in the reverse direction. This brings the return spring 48 into an initial state and releases the braking force applied to the disc rotor D by the inner brake pad 22 and the outer brake pad 23.

If the electric motor 39 or the control board 38 fails during the braking, a biasing force reserved in the return spring 48 in the process of the braking causes the push rod 42 to retreat while making the relative rotation in the reverse direction and thus loosens the braking force applied from the inner brake pad 22 and the outer brake pad 23 to the disc rotor D.

As discussed above, to implement positional control and thrust control, the electric brake 20 includes the rotation angle sensor 46 that is capable of detecting the rotation angle of the electric motor 39, the thrust sensor 44 that is capable of detecting the thrust of the piston 32, and the current sensor 49 that detects the motor current. To deal with a failure that incurs during the generation of the thrust, the electric brake 20 further includes the return mechanism 45 (fail open mechanism) that is capable of releasing the thrust.

The following description explains, with reference to FIGS. 3 to 7, relation between motor rotating speed and the thrust when the electric brake 20 is in a normal state and relation between the motor rotating speed and the thrust when the electric brake 20 is in an abnormal state.

Figure 3:
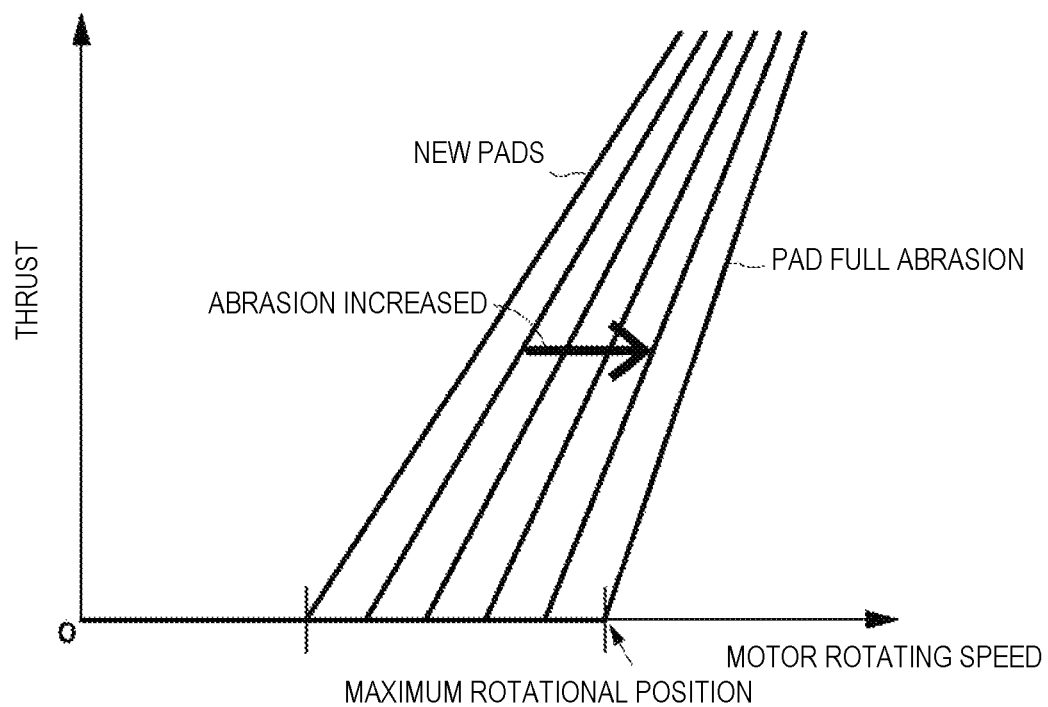
FIG. 3 is an explanatory chart showing relation between motor rotating speed and a thrust when the electric brake operates in a force-increasing direction in a normal state.

FIG. 3 shows the relation between the motor rotating speed and the thrust when the electric brake 20 operates in a force-increasing direction in the normal state. As a result of an increase in the motor rotating speed, a motor torque is transmitted to gear teeth of the deceleration mechanisms 35 and 36 and then transmitted from the gear teeth to the ball screw mechanism 41 (rotation-linear motion mechanism). The piston 32 then moves in a force-increasing direction, generating and increasing the thrust. During a time period between when the brake pads 22 and 23 are new and when the brake pads 22 and 23 are fully abraded (abraded to the maximum), the brake pads 22 and 23 are increased in rigidity with an increase in pad abrasion amount. The thrust is therefore likely to incline more steeply as the brake pads 22 and 23 are increased in pad abrasion amount. According to such a change, the abnormality judgment processing uses a formula of Mathematical 1 below to compute an inclination from difference in the thrust and difference in the motor rotating speed in a certain interval and judges whether the inclination is in a normal range. The normal range is a range of inclination of the thrust when the pad abrasion amount is less than the full abrasion. The normal range of the thrust inclination can be previously obtained through an experiment or the like. For example, if the thrust inclination is more moderate than in the normal range illustrated in FIG. 3, that is, if the thrust inclination is smaller than a minimum value (for example, inclination when the pads 22 and 23 are new), it is judged that thrust generation amount is smaller than the rotating speed and therefore that efficiency is deteriorated (efficiency abnormality).

$$\text{Inclination} = \frac{\text{Difference in thrust}}{\text{Difference in motor rotating speed}} \quad \text{[Mathematical 1]}$$

Figure 4:
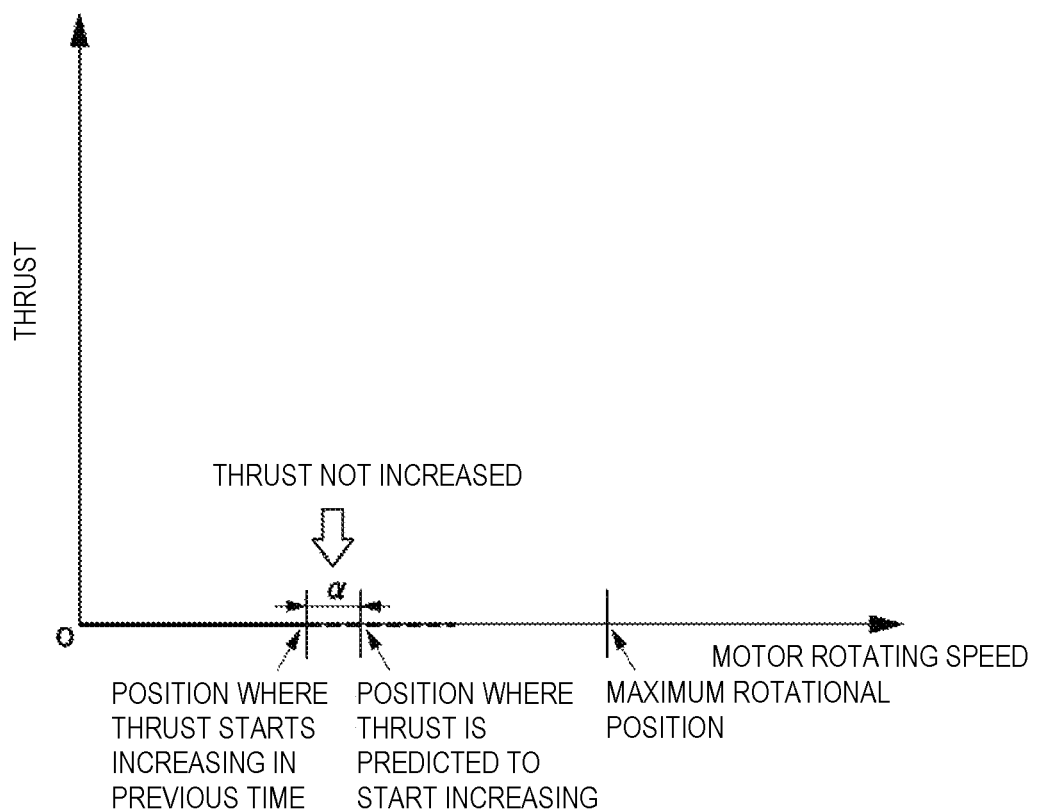
FIG. 4 is an explanatory chart showing relation between motor rotating speed and a thrust when an idling abnormality occurs.

FIG. 4 shows relation between the motor rotating speed and the thrust when an idling abnormality occurs, for example, due to full abrasion (maximum abrasion) in the gear teeth of the deceleration mechanisms 35 and 36 or for another reason. The idling abnormality is a state in which, despite that the electric motor 39 rotates on a thrust generation side, the motor torque fails to be transmitted to the ball screw mechanism 41 due to full abrasion in the gear teeth or for another reason, and therefore, the thrust is not be increased. The idling abnormality brings about a situation where, assuming that the electric brake 20 normally operates in a previous time, there is no change in the thrust even if the motor is rotated so that motor rotating speed reaches a position where the thrust is predicted to start increasing, which is a position obtained by adding an allowable error (a) to a position where the thrust starts increasing in the previous time, as shown by a broken line in FIG. 4.

Figure 5:
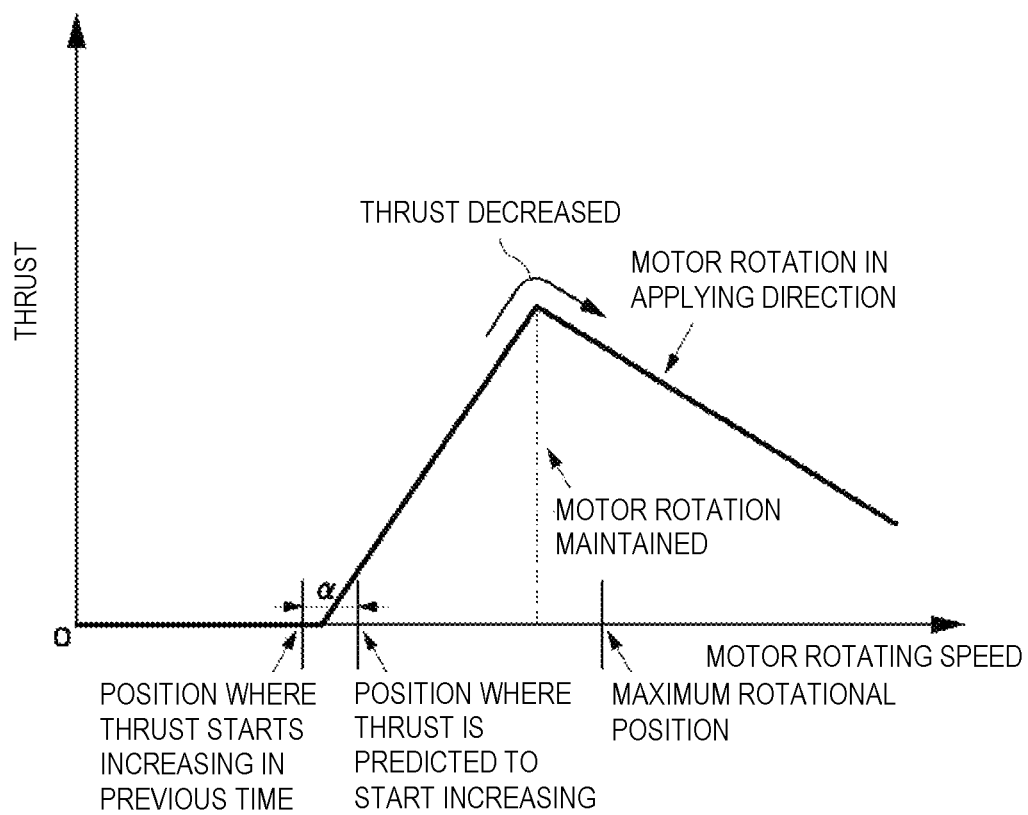
FIG. 5 is an explanatory chart showing relation between motor rotating speed and a thrust when an idling abnormality occurs during generation of the thrust.

FIG. 5 shows relation between the motor rotating speed and the thrust when the idling abnormality occurs during the generation of the thrust. As illustrated in FIG. 5, if the idling abnormality occurs during control for increasing the thrust by increasing the motor rotating speed, the thrust is not be increased. Likewise, if the idling abnormality occurs during control for maintaining the thrust by suspending the motor rotation, the thrust is not be maintained. In these cases, the thrust is decreased by the return mechanism 45 (fail open mechanism).

Figure 6:
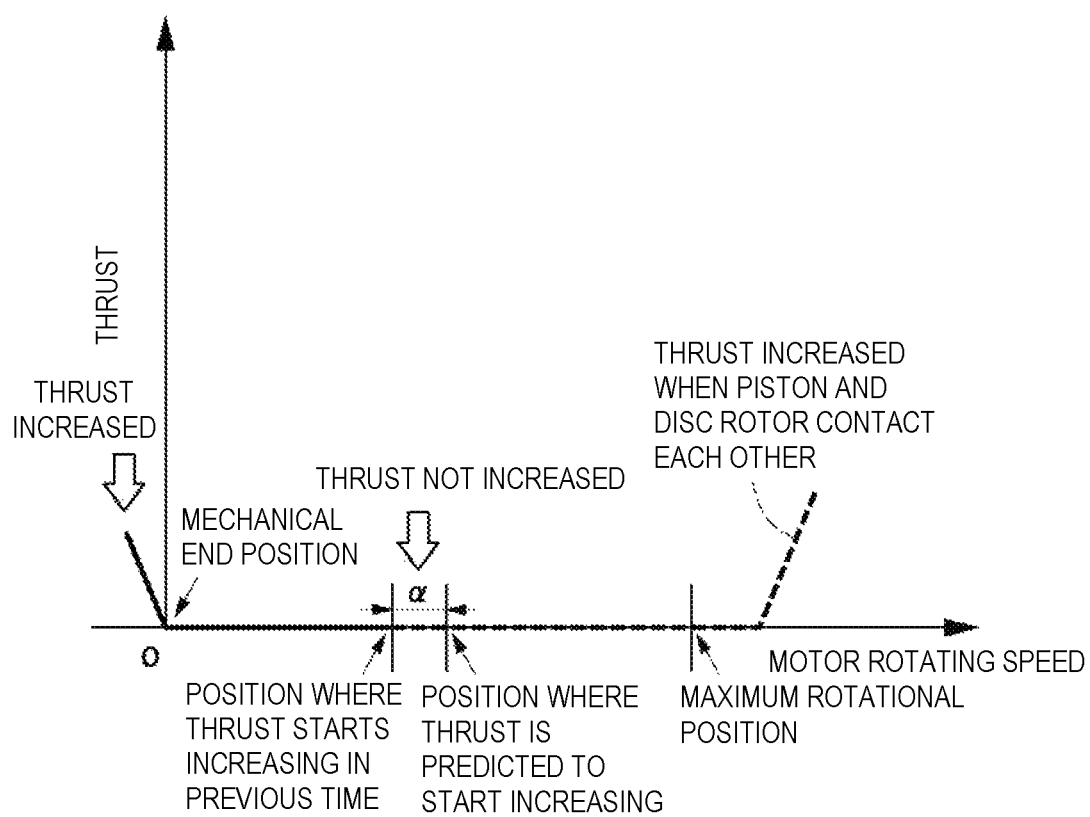
FIG. 6 is an explanatory chart showing relation between motor rotating speed and a thrust when a pad falling abnormality occurs.

FIG. 6 shows relation between the motor rotating speed and the thrust when a pad falling abnormality occurs. As shown by a broken line in FIG. 6, in the event of the pad falling abnormality, the thrust is not increased (does not rise) at a motor rotating speed position where the thrust is supposed to be generated. This is similar behavior as seen in the case of the idling abnormality illustrated in FIG. 4. The pad falling abnormality differs from the idling abnormality in that the piston 32 and the disc rotor D come into direct contact with each other at a position that is obtained by adding the motor rotating speed corresponding to amount of thickness of the pads to a normal-time maximum rotation position. The thrust consequently starts increasing. In short, the thrust does not rise. On the other hand, the direct contact of the piston 32 with the disc rotor D causes another trouble, such as deformation of the disc rotor D and the falling of the piston 32. In this view, the electric motor 39 is not actually rotated to reach or excess the maximum rotation position.

To judge whether there is the pad falling abnormality, the electric motor 39 is rotated in a thrust reducing direction (release direction) if the generation of the thrust is not recognized at the position where the thrust is predicted to start increasing. If there is the pad falling abnormality, the thrust starts increasing when the electric motor 39 reaches a mechanical end position that is the motor rotational position obtained when the piston 32 is moved to a farthest end in the release direction. If there is the idling abnormality, the thrust is not increased even if the electric motor 39 reaches the mechanical end position. The pad falling abnormality and the idling abnormality can be discriminated from each other by utilizing the aforementioned characteristics.

There is a fixed correspondence relation between the thrust detected by the thrust sensor 44 and the current detected by the current sensor 49. For example, in the event of the pad falling abnormality, if the amount of rise (increase) in the thrust at the mechanical end position is small, and the pad falling abnormality is difficult to be judged, the detected value of the current which is detected by the current sensor 49 may be used, instead of using the detected value of the thrust which is detected by the thrust sensor 44.

Figure 7:
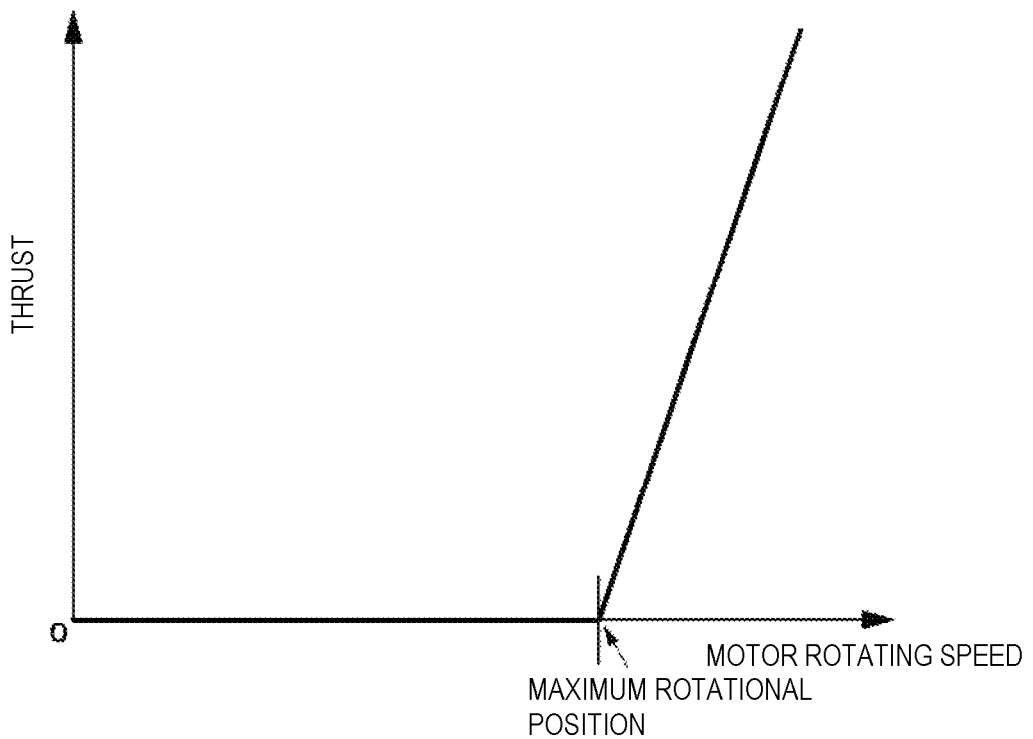
FIG. 7 is an explanatory chart showing relation between motor rotating speed and a thrust when a pad full abrasion abnormality occurs.

FIG. 7 shows relation between the motor rotating speed and the thrust when a pad full abrasion abnormality occurs. As illustrated in FIG. 7, if the brake pads 22 and 23 are abraded to the maximum, and the pads are fully abraded, the thrust rises when the electric motor 39 reaches a predetermined maximum rotational position. The pad full abrasion abnormality is judged to urge the driver to replace the pads.

In this light, the maximum rotational position may be set before the position of the pad full abrasion to urge the driver early to replace the pads.

The following description explains processing of abnormality judgement with respect to the brake mechanism 21 by the rear electric brake ECU 11. Based on the relation between the motor rotating speed and the thrust illustrated in FIGS. 4 to 7, the rear electric brake ECU 11 discriminates abnormalities of various kinds which occur in the brake mechanism 21.

FIGS. 8 to 14 show abnormality judgment processings carried out on the basis of characteristics of the abnormalities shown in FIGS. 4 to 7 and processings associated therewith. The processings shown in FIGS. 8 to 14 are carried out with respect to each wheel. For example, if the electric brake 20 is installed in each of the left rear wheel 5L and the right rear wheel 5R, the aforementioned processings are carried out with respect to each of the left rear wheel 5L and the right rear wheel 5R.

Steps shown in flowcharts of FIGS. 8 to 14 are represented by letter "S". For example, Step 1 is denoted by "S1". The processings shown in FIGS. 8 to 14 are separately but concurrently performed in predetermined control cycles.

Figure 8:
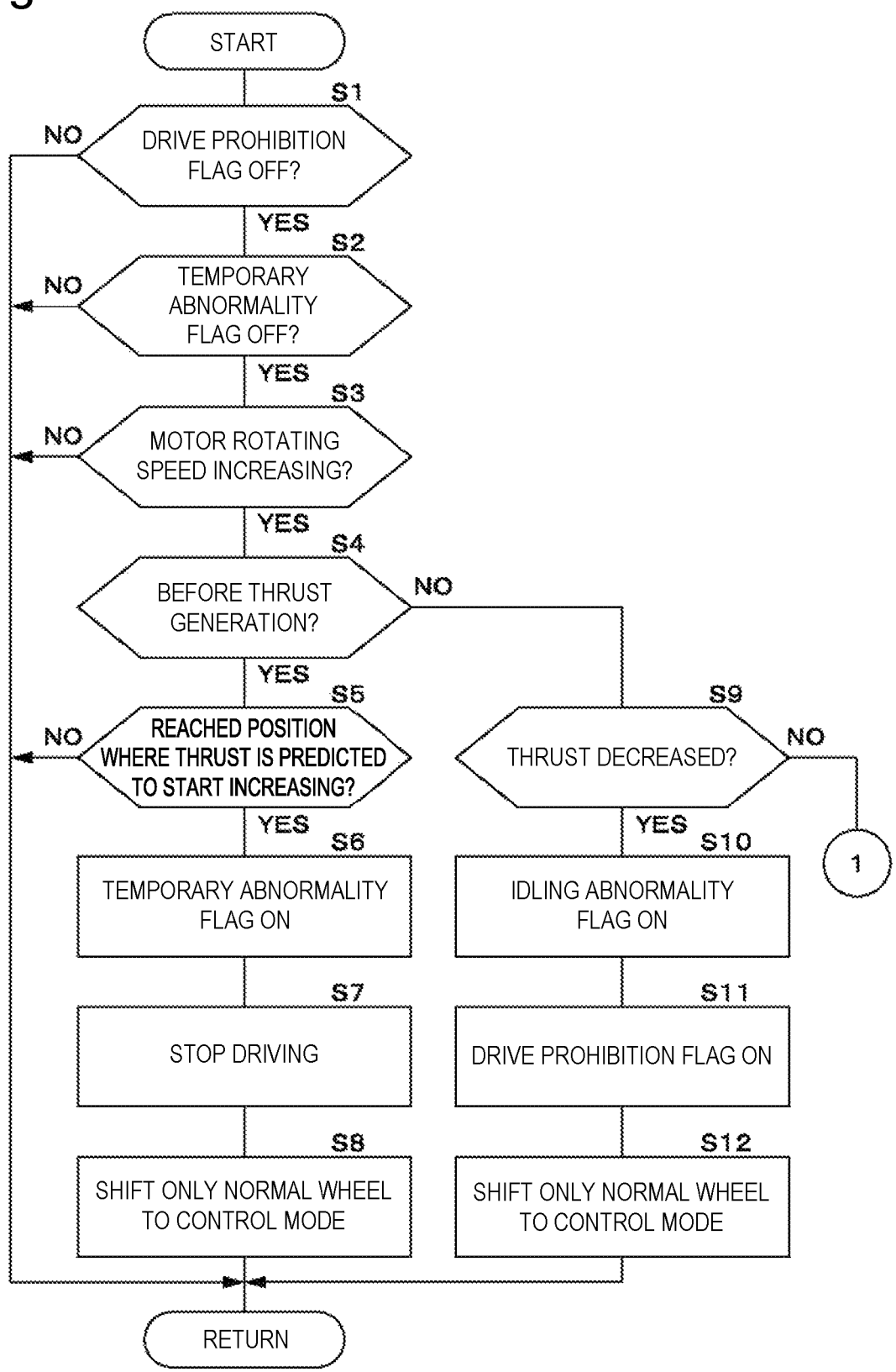
FIG. 8 is a flowchart showing a processing of abnormality judgment with respect to an electric brake.
Figure 9:
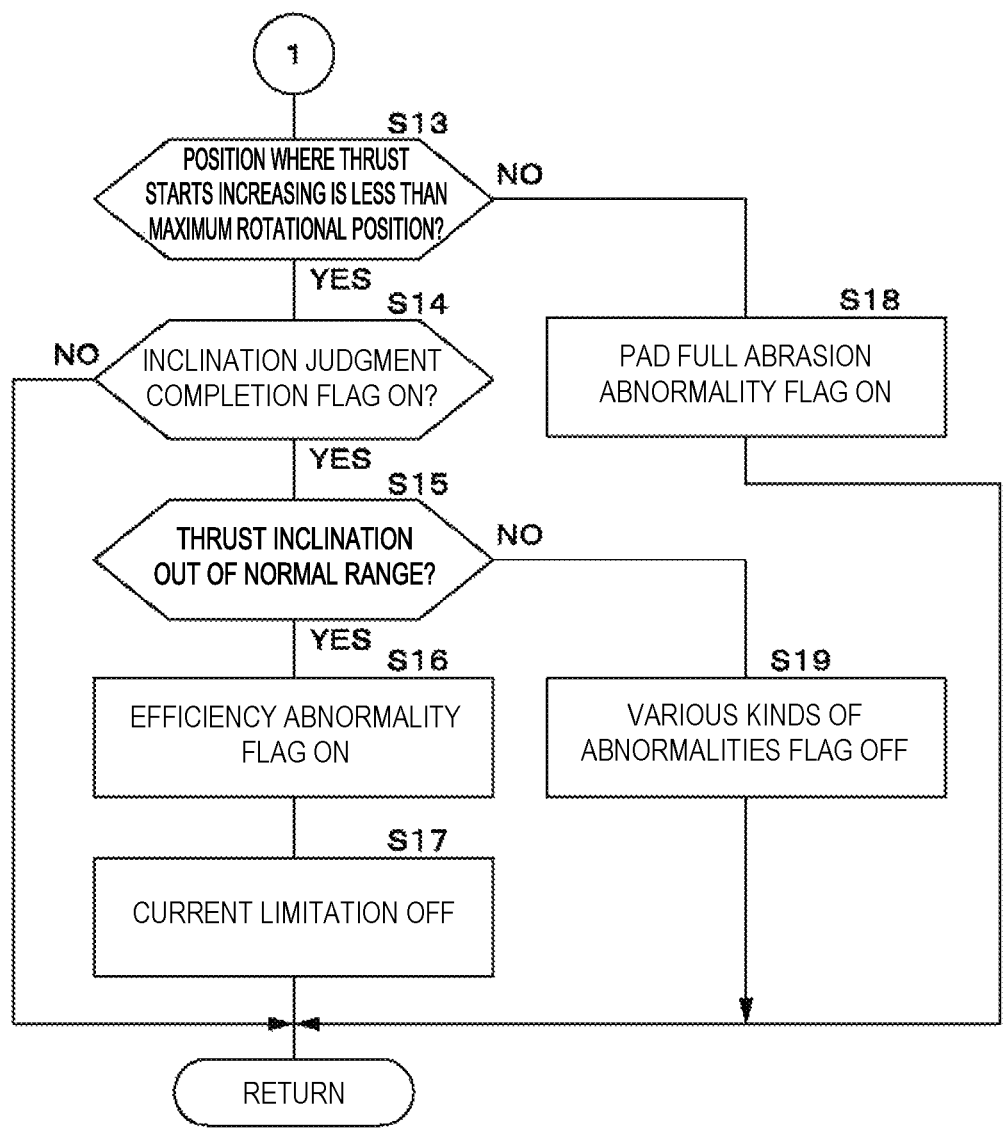
FIG. 9 is a flowchart continuing from FIG. 8.

FIGS. 8 and 9 show the processings of the abnormality judgment with respect to the electric brake 20.

At S1 of FIG. 8, it is judged whether a drive prohibition flag is OFF. The drive prohibition flag is a flag for prohibiting the driving of the electric brake 20. If the drive prohibition flag is ON, a result of judgment at S1 is NO, and the routine moves to a return step to end the present processing. If the drive prohibition flag is OFF, the result of judgment at S1 is YES, and the routine moves to S2.

At S2, it is judged whether a temporary abnormality flag is OFF. The temporary abnormality flag is a flag indicating a possibility of occurrence of either the idling abnormality or the pad falling abnormality. If the temporary abnormality flag is ON, the result of judgment at S2 is NO, and the routine moves to the return step. At the same time, an idling/pad falling confirmation processing (see FIG. 10) which is the processing carried out after the temporary abnormality flag is ON, is also carried out. If the temporary abnormality flag is OFF, the result of judgment at S2 is YES, and the routine moves to S3.

At S3, on the basis of the detected value of the rotation angle sensor 46, it is judged whether the motor rotating speed is being increased, that is, whether the electric motor 39 operates in a thrust generating direction. If S3 judges that the motor rotating speed is being increased, the result of judgement at S3 is YES, and the routine moves to S4. If the motor rotating speed is not being increased, the result of judgment at S3 is NO, and the present processing ends. If the motor rotating speed is not being increased, a possible cause is that the electric motor 39 does not yet start operating, that the electric motor 39 operates in a thrust releasing direction to reduce the motor rotating speed or that the motor rotation is suspended through control to maintain the thrust.

At S4, it is judged whether the thrust is not yet generated. To be specific, S4 judges whether the thrust is increased to exceed a detection error. If the thrust is not yet generated, that is, if the motor rotating speed is increased in a clearance area in a normal state, the result of judgment at S4 is YES, and the routine moves to S5. If the thrust is already generated, the result of judgment at S4 is NO, and the routine moves to S9.

At S5, it is judged whether the motor rotating speed reaches the position where the thrust is predicted to start increasing. The position where the thrust is predicted to start increasing is a position that is obtained by adding the allowable error to the position where the thrust rises (starts increasing) in the previous time. If the motor rotating speed does not reach the position where the thrust is predicted to start increasing, the result of judgment at S5 is NO, and the routine moves to the return step.

If the motor rotating speed reaches the position where the thrust is predicted to start increasing, the result of judgment at S5 is YES, and the routine moves to S6. When this happens, it is judged that the thrust does not rise at a position where the thrust is supposed to rise. This is considered to be because either the idling abnormality or the pad falling abnormality occurs. At S6, therefore, the temporary abnormality flag is switched on, and the routine moves to S7. S7 temporarily suspends the driving of the electric motor 39. The routine then moves to S8. S8 excludes the wheel judged as having an abnormality from subject of braking control and shifts to the braking control implemented exclusively on a normal wheel. After this processing is over, the wheel judged as having an abnormality is subjected to the idling/pad falling confirmation processing (see FIG. 10) for confirming whether the abnormality is idling or pad falling. The idling/pad falling confirmation processing is carried out when the temporary abnormality flag is ON.

At S9, it is judged whether a value of the thrust which is detected by the thrust sensor 44 is decreased in spite of the decrease in the thrust, that is, an increase in the motor rotating speed. If the thrust is decreased, the result of judgment at S9 is YES, and the routine moves to S10. At this point of time, it is judged that idling occurs. At S10, therefore, an idling abnormality flag is switched on, and the routine moves to S11. At S11, the drive prohibition flag is switched on, and the routine moves to S12. S12 excludes the wheel judged as having an abnormality from subject of the braking control and shifts to the braking control implemented exclusively on the normal wheel. The routine then moves to the return step to end the present processing. If the thrust is not decreased, the result of judgement at S9 is NO, and the routine moves to S13.

At S13, it is judged whether the position where the thrust starts increasing is before a maximum rotational position where the thrust reaches when the pads are fully abraded. If the position where the thrust starts increasing is before the maximum rotational position, the result of judgment at S13 is YES, and the routine moves to S14. If the position where the thrust starts increasing is the maximum rotational position, the result of judgment at S13 is NO, and the routine moves to S18. At this point of time, it is judged that the pads are fully abraded. At S18, therefore, a pad full abrasion abnormality flag is switched on, and the routine moves to the return step to end the processing.

Figure 11:
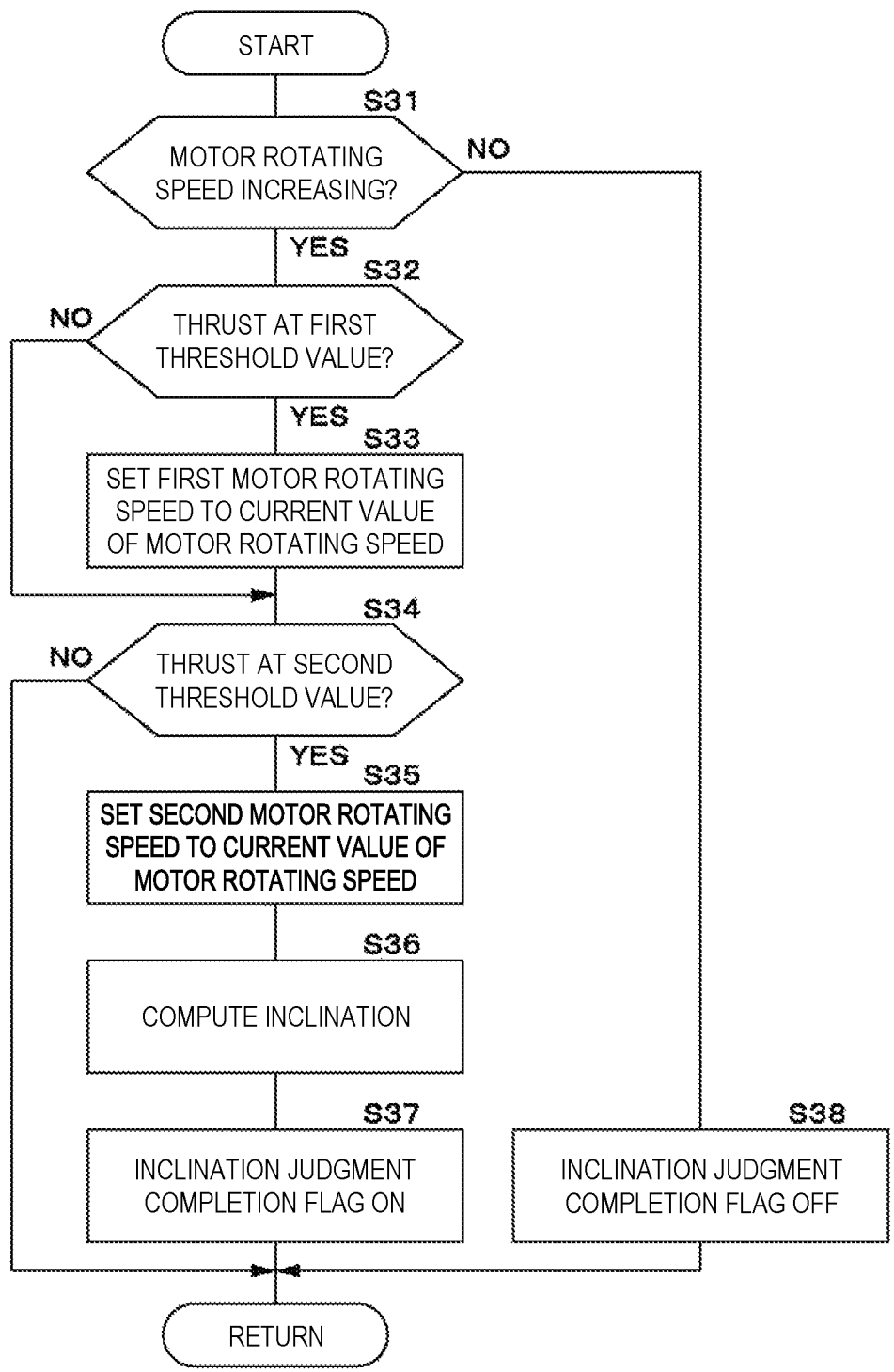
FIG. 11 is a flowchart showing a processing of judgment of thrust inclination relative to motor rotating speed.

At S14, it is judged whether an inclination judgment illustrated in FIG. 11 is completed. If the inclination judgment is completed, an inclination judgment completion flag is ON. The result of judgment at S14 is therefore YES. The routine moves to S15. If the inclination judgment is not completed, the inclination judgment completion flag is OFF. The result of judgment at S14 is therefore NO. The routine moves to the return step to end the processing.

At S15, it is judged whether the thrust inclination relative to the motor rotating speed is out of a normal range. Specifically, S15 judges whether the thrust inclination relative to the motor rotating speed is insufficient (decreased) to be less than the normal range. In the thrust inclination is in the normal range, it means that the thrust inclination is normal. The result of judgment at S15 is therefore NO, and the routine moves to S19. S19 switches off the abnormality flags of various kinds (temporary abnormality flag, idling abnormality flag, pad falling abnormality flag, efficiency abnormality flag, and pad full abrasion abnormality flag) and ends the processing (the routine moves to the return step).

If the thrust inclination is out of the normal range, the result of judgment at S15 is YES, and the routine moves to S16. At this point of time, the thrust inclination relative to the motor rotating speed is considered to be insufficient. At S16, therefore, the efficiency abnormality flag is switched on, and the routine moves to S17. It is considered necessary to increase a maximum generated thrust of an abnormal wheel so as to compensate the insufficiency of the maximum generated thrust at the time of occurrence of the efficiency abnormality. S17 then increases a current limit value of the electric motor 39. The routine moves to the return step to end the processing. S17 may exclude the wheel judged as having an abnormality from subject of braking control and shift to braking control implemented exclusively on the normal wheel.

Figure 10:
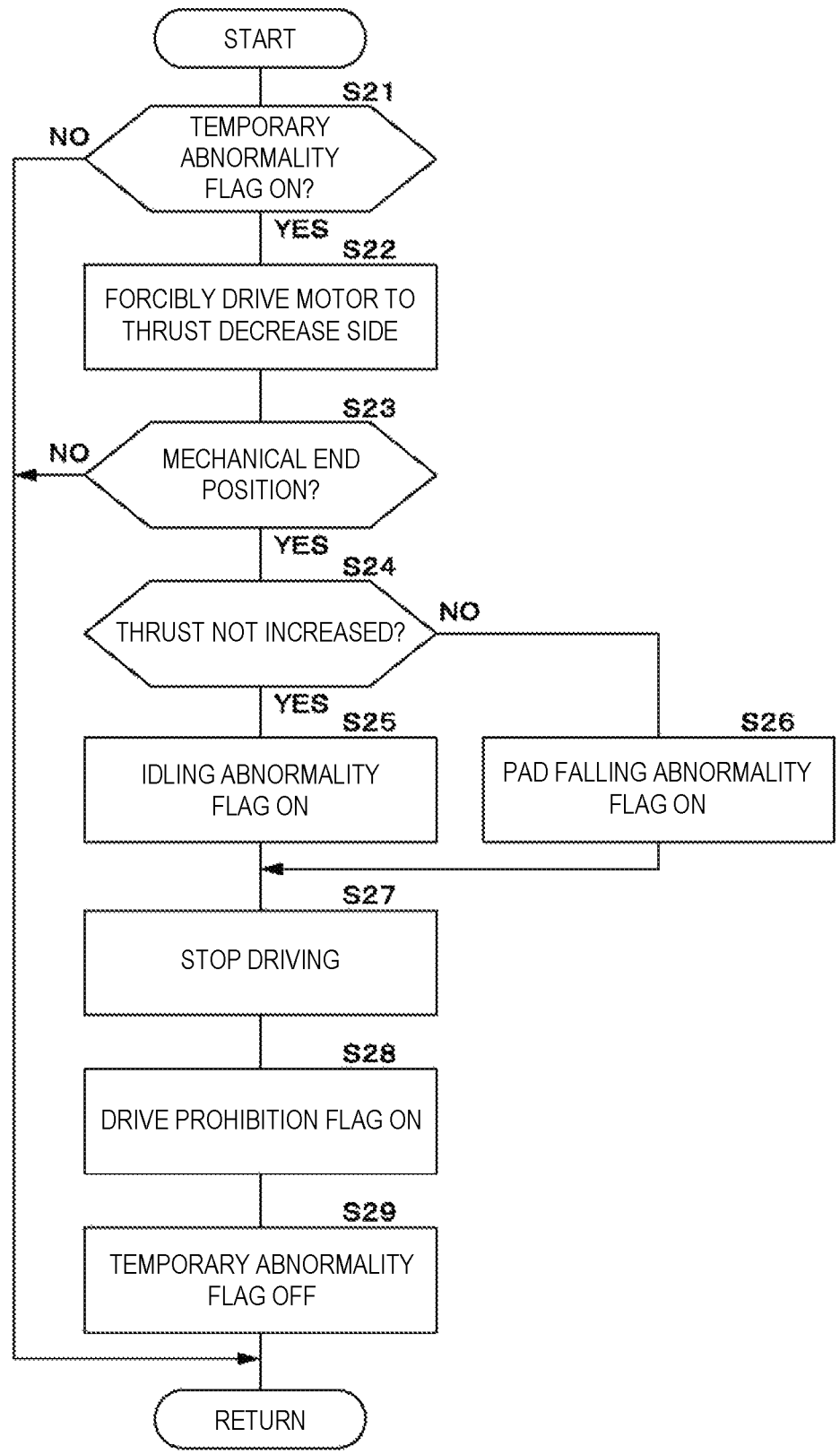
FIG. 10 is a flowchart showing an idling/pad falling confirmation processing.

FIG. 10 shows an idling/pad falling confirmation processing for confirming whether the abnormality is idling or pad falling.

At S21, it is judged whether the temporary abnormality flag is ON. If the temporary abnormality flag is ON, the result of judgment at S21 is YES, and the routine moves to S22. If the temporary abnormality flag is OFF, the result of judgment at S21 is NO, and S21 judges that the abnormality is not subject to the present processing and ends the processing (the routine moves to the return step).

S22 implements processing for forcibly driving the electric motor 39 in a force reducing direction (release direction) to make a judgment at the mechanical end position that is a position where the electric motor 39 is rotated to the maximum in the release direction. The routine then moves to S23.

At S23, it is judged whether the electric motor 39 is driven in the release direction to a motor rotation position corresponding to the mechanical end by the release driving. If the electric motor 39 is driven as far as the mechanical end position, the result of judgment at S23 is YES, and the routine moves to S24. If the electric motor 39 does not reach the mechanical end position, the result of judgment at S23 is NO. The routine moves to the return step to end the processing.

At S24, it is judged whether the thrust detected by the thrust sensor 44 at the mechanical end position is increased, that is, whether the thrust is maintained at zero. If the thrust is increased (rises) at S24, the result of judgment at S24 is NO, and the routine moves to S26. S26 judges that at least either one of the pads 23 and 24 falls, and switches on the pad falling abnormality flag. If the thrust is not increased (does not rise), the result of judgment at S24 is YES, and the routine moves to S25. S25 judges that the idling abnormality occurs, in which the thrust is not generated by driving the electric motor 39, for example, due to full abrasion of gear teeth of the deceleration mechanisms 35 and 36 or for another reason. S25 then switches on the idling abnormality flag. Since there is the fixed correspondence relation between the thrust detected by the thrust sensor 44 and the current detected by the current sensor 49, a current value detected by the current sensor 49 may be used, instead of using a thrust value detected by the thrust sensor 44.

When S25 and S26 end, S27 to S29 are carried out. Since the abnormality is confirmed, S27 stops the driving of the electric brake 20 provided to the abnormal wheel. S28 switches on the drive prohibition flag to prohibit the driving of the electric brake 20 of the abnormal wheel. S29 switches off the temporary abnormality flag since the abnormality is confirmed. When S29 ends, the routine moves to the return step to end the processing.

FIG. 11 shows the processing of judgment of the thrust inclination relative to the motor rotating speed, which is a reference of judgment as to whether an efficiency abnormality occurs during an increase in the motor rotating speed.

At S31, it is judged whether the motor rotating speed is being increased. If the motor rotating speed is being increased at S31, the result of judgment at S31 is YES, and the routine moves to S32. If the motor rotating speed is not being increased, the result of judgment at S31 is NO. S31 judges that the abnormality is not subject to the judgment by the present processing, and the routine moves to S38. S38 switches off the inclination judgment completion flag and ends the processing (the routine moves to the return step).

At S32, it is judged whether the thrust reaches a first threshold value for making the inclination judgment. To make the inclination judgment in as short a time as possible from a point of time when the thrust starts increasing, the first threshold value is set to a smallest value of the thrust within a range that allows the inclination judgment to be made. The first threshold value is previously determined, for example, on the basis of an experiment result. If the thrust reaches the first threshold value, the result of judgment at S32 is YES, and the routine moves to S33. At 33, the motor rotating speed at a point of time when the thrust reaches the first threshold value is stored. If the thrust does not yet reach the first threshold value or exceeds the first threshold value, the result of judgment at S32 is NO, and the routine moves to S34.

At S34, it is judged whether the thrust reaches a second threshold value for making the inclination judgment. The second threshold value is set to a smallest value of the thrust within a range that allows the inclination judgment to be made and enables a measurement error to be reduced. The second threshold value is previously determined, for example, on the basis of an experiment result. If the thrust reaches the second threshold value, the result of judgment at S34 is YES, and the routine moves to S35. At S35, the motor rotating speed at a point of time when the thrust reaches the second threshold value is stored, and the routine moves to S36. S36 computes the thrust inclination when the thrust is changed between the first and second threshold values. To be more specific, on the basis of the formula of Mathematical 1, difference between the thrust at the first threshold value and the thrust at the second threshold value is divided by difference between the motor rotating speed corresponding to the first threshold value and the motor rotating speed corresponding to the second threshold value. The subsequent S37 switches on the inclination judgment completion flag and ends the processing (the routine moves to the return step). If the thrust does not yet reach the second threshold value or exceeds the second threshold value, the result of judgment at S34 is NO. S34 judges that the inclination judgement is in process or completed and ends the processing.

Figure 12:
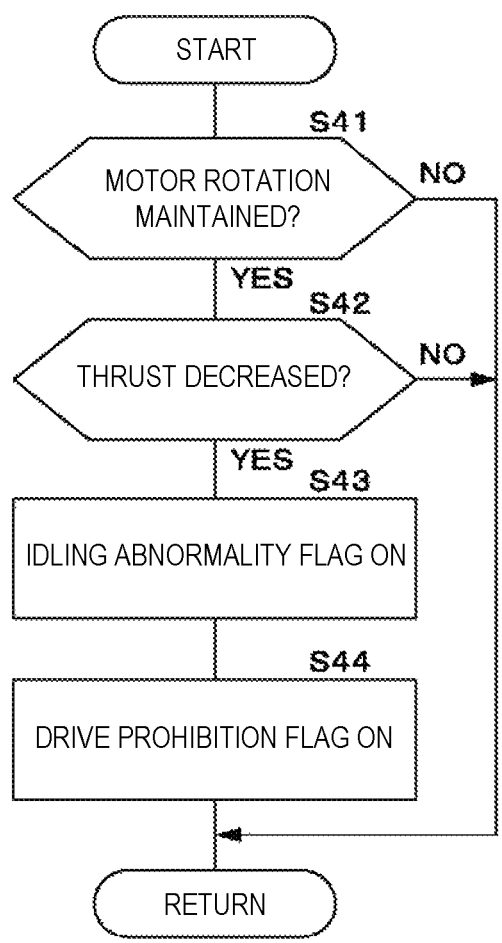
FIG. 12 is a flowchart showing a processing of abnormality judgment for judging an idling abnormality while the motor rotating speed is maintained.

FIG. 12 shows a processing of abnormality judgment for judging the idling abnormality while the motor rotating speed, namely the thrust, is maintained.

At S41, it is judged whether the rotation of the electric motor 39 (motor rotation) is maintained. If the motor rotation is not maintained, and the electric motor 39 is rotated, the result of judgment at S41 is NO. S41 judges that the abnormality is not subject to the judgment. The routine then moves to the return step to end the processing. If the motor rotation is maintained, the result of judgement at S41 is YES, and the routine moves to S42.

S42 judges whether the thrust is decreased despite that the thrust maintaining control is implemented. If the thrust is decreased, the result of judgment at S42 is YES, and the routine moves to S43. S43 judges that idling occurs, and switches on the idling abnormality flag. The subsequent S44 switches on the driving prohibition flag. The routine moves to the return step to end the processing. If the thrust is not decreased, the result of judgment at S42 is NO, and the routine moves to the return step.

Figure 13:
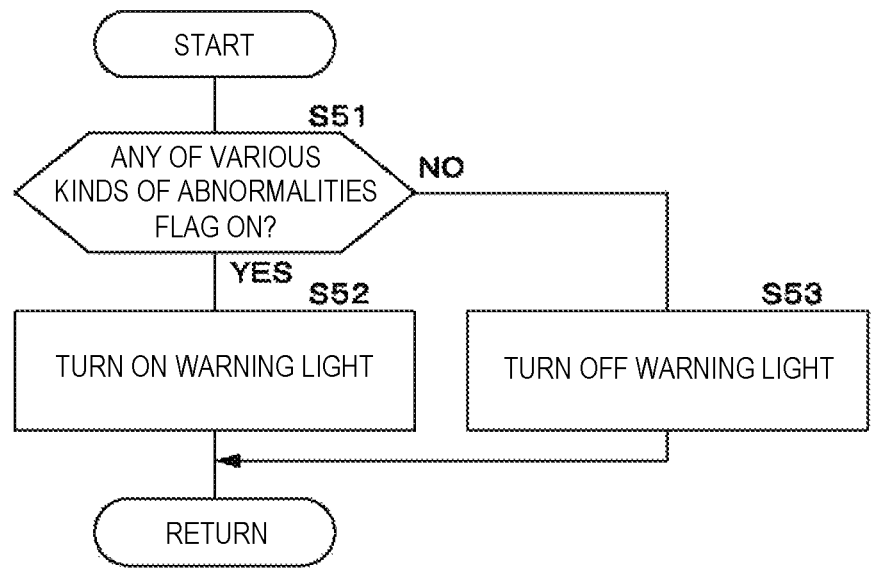
FIG. 13 is a flowchart showing a processing of turning on a warning light.

FIG. 13 shows a processing of turning on a warning light for informing the driver of abnormality occurrence.

At S51, it is judged whether any one of the abnormality flags of various kinds is ON. For example, if any one of the temporary abnormality flag, the idling abnormality flag, the pad falling abnormality flag, the efficiency abnormality flag, and the pad full abrasion abnormality flag is ON, the result of judgment at S51 is YES, and the routine moves to S52. S52 turns on the warning light. S52 may indicate a specific kind of the abnormality, instead of turning on the warning light. For example, if the temporary abnormality flag, the idling abnormality flag, the pad falling abnormality flag, the efficiency abnormality flag, and the pad full abrasion abnormality flag are all OFF, the result of judgment at S51 is NO, and the routine moves to S53. S53 turns off the warning light and ends the processing.

Figure 14:
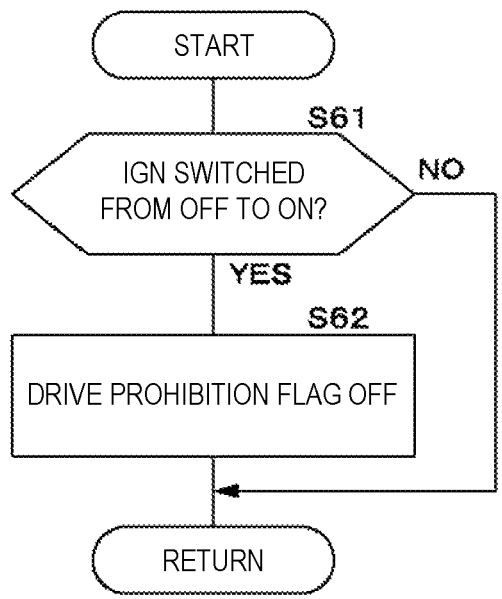
FIG. 14 is a flowchart showing a processing of resetting a drive prohibition flag by IGN.

FIG. 14 shows a processing of resetting the drive prohibition flag by IGN (ignition).

At S61, it is judged whether a signal of ignition (IGN signal) in a previous time is OFF, and an IGN signal in the present time is ON. For example, when the driver switches an ignition switch from an OFF state to an ON state by operating the ignition switch, the result of judgment at S61 is YES, and the routine moves to S62. S62 switches off the drive prohibition flag and ends the processing. If the ignition switch is not switched from the OFF state to the ON state, the result of judgment at S61 is NO. S61 does not carry out the resetting and ends the processing. The resetting of the drive prohibition flag may be carried out, for example, by a terminal exclusively for a dealer, instead of through the IGN signal.

If the processing is done to deal with the abnormality, the routine proceeds through the steps to S19 shown in FIG. 9 after the drive prohibition flag is reset (switched off). At this point of time, the abnormality flags of various kinds are switched off, and the wheels are then recognized as normal. Without repair, the same abnormality as the one before the resetting occurs even after the drive prohibition flag is reset. The routine then proceeds through the steps at which the drive prohibition flag is set (switched on) again.

According to the embodiment, the rear electric brake ECU 11 detects the abnormality in the brake mechanism 21 from the detected value of the thrust sensor (thrust detecting portion) and the detected value of the rotation angle sensor 46 (rotational position detecting portion) in response to the braking command when the electric motor 39 is driven. This makes it possible to specify the kind of the abnormality in the brake mechanism 21 and raise an immediate alert to the driver. Accordingly, maintainability and safety are improved.

At this point of time, the rear electric brake ECU 11 changes the control of the electric motor 39 according to the detected abnormality in the brake mechanism 21. Specifically, the rear electric brake ECU 11 carries out an abnormality judgment processing described below.

For example, the rear electric brake ECU 11 drives the electric motor 39 in response to the braking command in an applying direction where the brake pads 22 and 23 approach the disc rotor D. When the thrust is not increased within a predetermined range from the position where the thrust starts increasing in the previous time to the position where the thrust is predicted to start increasing, the rear electric brake ECU 11 stops the driving of the electric motor 39. In this case, the brake mechanism 21 is considered to have the idling abnormality or the pad falling abnormality. This makes it impossible to generate the braking force according to the braking command. The rear electric brake ECU 11 therefore carries out the following processing for discriminating the idling abnormality and the pad falling abnormality from each other after stopping the driving of the electric motor 39.

The rear electric brake ECU 11 drives the electric motor 39 in a release direction where the brake pads 22 and 23 move away from the disc rotor D. When the thrust is increased at the motor rotation position (mechanical end position) at the time when the electric motor 39 moves the piston 32 to the farthest end in the release direction, the rear electric brake ECU 11 prohibits the driving of the electric motor 39. In such a case, the brake mechanism 21 is considered to have the pad falling abnormality. The rear electric brake ECU 11 therefore prohibits the driving of the electric motor 39 and uses the warning light or the like to urge the driver to fix the brake pads 22 and 23.

In response to the braking command, when the thrust of the electric motor 39 is increased to a predetermined position before the maximum rotational position where the electric motor 39 is rotated to the maximum in the applying direction where the brake pads 22 and 23 approach the disc rotor D, that is, within a range up to the position where the thrust is predicted to start increasing, and the thrust is increased more slowly as compared to the rotating speed of the electric motor 39, the rear electric brake ECU 11 judges that there is an abnormal wheel and increases a limit current value of the electric motor 39 of the abnormal wheel. In this case, there is a possibility that the efficiency abnormality occurs, in which the thrust increase becomes slower than the rotating speed of the electric motor 39 as compared to the normal state. The rear electric brake ECU 11 then increases the limit current value of the electric motor 39. This makes it possible to increase the current supplied to the electric motor 39 to compensate the insufficiency of the thrust.

When the efficiency abnormality occurs, the rear electric brake ECU 11 may prohibit the driving of the electric brake 20 (electric motor 39) of the abnormal wheel in which the efficiency abnormality occurs and carry out the braking on the normal wheel, instead of increasing the limit current value of the electric motor 39.

In response to the braking command, when the thrust is increased at the maximum rotational position where the electric motor 39 is rotated to the maximum in the applying direction where the brake pads 22 and 23 approach the disc rotor D, the rear electric brake ECU 11 continues the normal braking control of the electric motor 39. In such a case, maximum abrasion occurs in the brake pads 22 and 23, which generates the pad full abrasion abnormality in the brake pads 22 and 23. The rear electric brake ECU 11 continues the normal braking control of the electric motor 39 and uses the warning light or the like to urge the driver to replace the brake pads 22 and 23.

In response to the braking command, when the thrust of the electric motor 39 is decreased while the thrust is increased within a predetermined range from the position where the thrust starts increasing in a previous time (within a range to the position where the thrust is predicted to start increasing), and the rotating speed of the electric motor 39 is maintained or increased, the rear electric brake ECU 11 prohibits the driving of the electric motor 39. In this case, the idling abnormality is considered to occur, for example, due to the full abrasion of gear teeth of the deceleration mechanisms 35 and 36 during the generation of the thrust or for another reason. The rear electric brake ECU 11 then prohibits the driving of the electric motor 39. At this point of time, the rear electric brake ECU 11 prohibits the driving of the electric brake 20 (electric motor 39) of the abnormal wheel in which the idling abnormality occurs and carries out the braking on the normal wheel.

According to the embodiment, the electric brakes 20 are applied to the rear wheels 5L and 5R. The electric brakes 20 may be applied to the front wheels 3L and 3R or may be applied to all the four wheels.

According to the embodiment, the rear electric brake ECU 11 detects an abnormality in the brake mechanism 21 from the thrust of the electric motor 39 and the rotational position of the electric motor 39 in response to the braking command when the electric motor 39 is driven. The invention does not necessarily have to be configured this way. The rear electric brake ECU 11 may detect an abnormality in the brake mechanism 21 from the thrust of the electric motor 39 in response to the braking command and the position of the piston 32 when the electric motor 39 is driven. In this case, the position of the piston 32 may be detected directly by sensor or may be detected indirectly through computation based on the rotational position of the electric motor 39.

Electric brakes based on the aforementioned embodiment include, for example, those according to the following modes.

An electric brake according to a first mode comprises a brake mechanism configured to transmit a thrust generated by driving an electric motor to a piston that moves brake pads pressed against a disc; a thrust detecting portion configured to detect the thrust applied to the piston; a rotational position detecting portion configured to detect a rotational position of the electric motor; and a control device configured to control the driving of the electric motor on the basis of a braking command. The control device detects an abnormality in the brake mechanism from a detected value of the thrust detecting portion and a detected value of the rotational position detecting portion in response to the braking command which are obtained when the electric motor is driven.

In a second mode according to the first mode, the control device specifies a kind of an abnormality in the brake mechanism on the basis of a detected value of the thrust detecting portion and a detected value of the rotational position detecting portion.

In a third mode according to the first or second mode, the control device changes control of the electric motor according to the detected abnormality in the brake mechanism.

In a fourth mode according to the first or third mode, in response to the braking command, the control device drives the electric motor in an applying direction where the brake pads approach the disc, and stops the driving of the electric motor when the thrust is not increased within a predetermined range from a position where the thrust starts increasing in a previous time.

In a fifth mode according to the fourth mode, the control device drives the electric motor in a release direction where the brake pads move away from the disc, and prohibits the driving of the electric motor when the thrust is increased at a motor rotational position that is obtained when the electric motor moves the piston to a farthest end in the release direction.

In a sixth mode according to the fourth mode, in response to the braking command, when the thrust is increased to a predetermined position before a maximum rotational position where the electric motor is rotated to the maximum in the applying direction, and the thrust is increased more slowly than rotating speed of the electric motor, the control device judges that there is an abnormal wheel and then increases a limit current value of the electric motor of the abnormal wheel or carries out the braking on the normal wheel.

In a seventh mode according to the fourth mode, in response to the braking command, when the thrust is increased at the maximum rotational position where the electric motor is rotated to the maximum in the applying direction, the control device continues to implement normal braking control on the electric motor.

In an eighth mode according to the fourth mode, in response to the braking command, when the thrust is increased within a predetermined range from a position where the thrust starts increasing in a previous time, and the thrust is decreased while the rotating speed of the electric motor is maintained or increased, the control device prohibits the driving of the electric motor.

Control devices based on the embodiment include those according to the following modes.

In a ninth mode, a control device is configured to control an electric motor of an electric brake comprising a brake mechanism that transmits a thrust generated by driving the electric motor to a piston that moves brake pads pressed against a disc. The control device detects an abnormality in the brake mechanism from a thrust of the electric motor and a rotational position of the electric motor in response to a braking command or a position of the piston which are obtained when the electric motor is driven.

The invention is not limited to the above-discussed embodiments and may be modified in various ways. For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2018-028929 filed on Feb. 21, 2018. The entire disclosure of Japanese Patent Application No. 2018-028929 filed on Feb. 21, 2018 including the description, claims, drawings and abstract, is incorporated herein by reference in its entirety.

REFERENCE SIGN LIST 3L, 3R: Front wheel
5L, 5R: Rear wheel
11: Rear electric brake ECU (Control device)
20: Electric brake
21: Brake mechanism
22: Inner brake pad
23: Outer brake pad
24: Caliper
32: Piston
35: Spur gear multistage deceleration mechanism
36: Planetary gear deceleration mechanism
37: Carrier
39: Electric motor
40: Rotary shaft
41: Ball screw mechanism
44: Thrust sensor (thrust detecting portion)
45: Return mechanism (fail open mechanism)
46: Rotational angle sensor (Rotation angle detecting portion)
47: Thrust maintaining portion
48: Return spring
49: Current sensor

The invention claimed is:

1. An electric brake comprising:
a brake mechanism configured to transmit a thrust generated by driving an electric motor to a piston that moves brake pads pressed against a disc;
a thrust detecting portion configured to detect the thrust applied to the piston;
a rotational position detecting portion configured to detect a rotational position of the electric motor; and
a control device configured to control the driving of the electric motor on the basis of a braking command,
the control device being configured to detect an abnormality in the brake mechanism from a detected value of the thrust detecting portion and a detected value of the rotational position detecting portion in response to the braking command which are obtained when the electric motor is driven,
wherein, in response to the braking command, the control device drives the electric motor in an applying direction where the brake pads approach the disc, and stops the driving of the electric motor when the thrust is not increased within a predetermined range from a position where the thrust starts increasing in a previous time.

2. The electric brake according to claim 1, wherein the control device specifies a kind of an abnormality in the brake mechanism on the basis of a detected value of the thrust detecting portion and a detected value of the rotational position detecting portion.

3. The electric brake according to claim 1, wherein the control device changes control of the electric motor according to the detected abnormality in the brake mechanism.

4. The electric brake according to claim 1, wherein the control device drives the electric motor in a release direction where the brake pads move away from the disc, and prohibits the driving of the electric motor when the thrust is increased at a motor rotational position that is obtained when the electric motor moves the piston to a farthest end in the release direction.

5. The electric brake according to claim 1, wherein, in response to the braking command, when the thrust is increased to a predetermined position before a maximum rotational position where the electric motor is rotated to the maximum in the applying direction, and the thrust is increased more slowly than rotating speed of the electric motor, the control device judges that there is an abnormal wheel and increases a limit current value of the electric motor of the abnormal wheel or carries out the braking on a normal wheel.

6. The electric brake according to claim 1, wherein, in response to the braking command, when the thrust is increased at the maximum rotational position where the electric motor is rotated to the maximum in the applying direction, the control device continues to implement normal braking control on the electric motor.

7. The electric brake according to claim 1, wherein, in response to the braking command, when the thrust is increased within a predetermined range from a position where the thrust starts increasing in a previous time, and the thrust is decreased while the rotating speed of the electric motor is maintained or increased, the control device prohibits the driving of the electric motor.

8. A control device that controls an electric motor of an electric brake comprising a brake mechanism that transmits a thrust generated by driving the electric motor to a piston that moves brake pads pressed against a disc, the control device being configured to detect an abnormality in the brake mechanism from a thrust of the electric motor and a rotational position of the electric motor in response to a braking command or a position of the piston which are obtained when the electric motor is driven, wherein, in response to the braking command, the control device drives the electric motor in an applying direction where the brake pads approach the disc, and stops the driving of the electric motor when the thrust is not increased within a predetermined range from a position where the thrust starts increasing in a previous time.

9. The electric brake according to claim 2, wherein the control device changes control of the electric motor according to the detected abnormality in the brake mechanism.

* * * * *